US012584503B2

(12) United States Patent
Arteaga et al.

(10) Patent No.: US 12,584,503 B2
(45) Date of Patent: Mar. 24, 2026

(54) SIDE LOAD CONTROL OF LONG STROKE SYSTEMS

(71) Applicant: Hydrog Inc., Houston, TX (US)

(72) Inventors: Alexis Arteaga, Bogota (CO); Andres Esteban Dostal, Bogota (CO)

( * ) Notice: Subject to any disclaimer, the term of this patent is extended or adjusted under 35 U.S.C. 154(b) by 391 days.

(21) Appl. No.: 18/213,217

(22) Filed: Jun. 22, 2023

(65) Prior Publication Data

US 2024/0426325 A1 Dec. 26, 2024

(51) Int. Cl.

| | |
|---|---|
| ***F15B 15/14*** | (2006.01) |
| ***F04B 49/20*** | (2006.01) |
| ***F15B 15/28*** | (2006.01) |
| ***F15B 20/00*** | (2006.01) |
| ***G08B 21/18*** | (2006.01) |

(52) U.S. Cl.

CPC .......... *F15B 15/1428* (2013.01); *F04B 49/20* (2013.01); *F15B 15/2815* (2013.01); *F15B 20/00* (2013.01); *G08B 21/182* (2013.01)

(58) Field of Classification Search

CPC .. F15B 15/1428; F15B 15/2815; F15B 20/00; F04B 49/20; F04B 47/02

See application file for complete search history.

(56) References Cited

U.S. PATENT DOCUMENTS

| | | | | |
|---|---|---|---|---|
| 2015/0211512 | A1* | 7/2015 | Wiegman | F04B 23/06 417/2 |
| 2017/0067333 | A1* | 3/2017 | Peters | E21B 7/068 |
| 2018/0181830 | A1* | 6/2018 | Luharuka | G06V 10/50 |
| 2021/0270261 | A1* | 9/2021 | Zhang | F04B 47/02 |
| 2021/0388705 | A1* | 12/2021 | Stephenson | F04B 53/001 |

* cited by examiner

*Primary Examiner* — Zhipeng Wang

(74) *Attorney, Agent, or Firm* — VEREB LAW GROUP PLLC

(57) ABSTRACT

Embodiments presented provide for an arrangement used in long stroke mechanical systems. In embodiments, the arrangement provides side load control of forces exerted on the long stroke systems due to operation. Such embodiments may be used in hydrocarbon recovery operations.

9 Claims, 11 Drawing Sheets

SIDE LOAD CONTROL OF LONG STROKE SYSTEMS

CROSS-REFERENCE TO RELATED APPLICATIONS

None

FIELD OF THE DISCLOSURE

Aspects of the disclosure relate to long stroke pumping systems. More specifically, aspects of the disclosure relate to arrangements related to long stroke pumping systems that provide resiliency and side load control.

BACKGROUND

Long stroke pumping systems are used in a variety of methods and applications in today's society. Such systems may be used, for example, where mechanical pumping is required for movement of fluids. As defined herein, fluids may be liquids or gasses. As the pumping of fluids is an integral part of how machinery operates, having systems that do not degrade over time is important. Degradation can lead to higher running costs, extended downtime and in some applications, worker or passenger safety issues.

While long stroke pumping systems have such a large importance in industry, it would be expected that conventional systems (i.e. systems already produced) would accomplish all of the tasks required. Unfortunately, conventional systems are keenly lacking in some areas, and as such, industry has had to accept consequences such as poor overall performance and repeated breakdown.

To prevent mechanical breakdown of such systems, efforts are put into production of high-quality components as well as conformance checks prior to the installation of the system. It is also known that conventional systems are subject to premature breaking; therefore, regular and early maintenance checking is required for such systems.

There is a need; however, within different industries and applications, for ever higher performance operations without the drawbacks discussed above. One such application is the recovery of hydrocarbons from field deposits. In this industry, failure of long stroke systems can have catastrophic consequences. For example, failure of components may result in halting of production, severely impacting the overall economic return for the project. At other times, according to the failure mode of the systems, field workers can be compromised in their health and wellbeing.

Use of long stroke systems is also becoming more prevalent within the hydrocarbon recovery industry. Generally, long stroke systems are used where "artificial" lift is needed, meaning that the pressure of the fluids below the surface are not great enough to allow extraction without pumping strategies. After 100 years of oil exploration, recoverable deposits of hydrocarbons that will transmit fluids directly to the surface by themselves are becoming exceedingly rare. As a result, the percentage of wellbores that need artificial lift increases. Despite the needs of industry, failures of conventional systems occur on a regular basis. Among the chief concerns/deficiencies with conventional apparatus, consistent management of structural loading of the long stroke systems during operation is especially problematic. Despite the risks described above, it is common practice in the hydrocarbon recovery industry to run long stroke systems until the systems fail in the field.

Referring to FIG. 1, a conventional long stroke artificial lift system 100 is illustrated. The system 100 is used to pump fluids from a downhole environment 102 to the up-hole environment 104. This is accomplished through actuation of a prime mover 106 that is belt or sheave 107 connected to a pumping unit 108. The rotation of the prime mover 106 allows the pumping unit 108 to move up and down relative to the wellbore 110. The wellbore 110 is made of an exterior casing 112 and interior tubing 114 placed within the casing 112. A bridle 116 is suspended from the pumping unit 108 and extends through a stuffing box 118. A sucker rod or series of connected sucker rods 120 connect the bridle 116 to a pump 122. The upward and downward motion of the pumping unit 108 combined with the pump 122 allows fluid flow up the wellbore 110 to an outlet flow line 124. As can be seen in FIG. 1, the sucker rod 120 undergoes a compression load when the pumping unit 108 extends downwardly, and a tension when the pumping unit 108 extends upwardly. This repeated series of compression and tension can cause the sucker rod 120 to fail at stress levels lower than the yield point of the material used for the sucker rod 120. In further applications, the wellbore 110 may be deviated, and additional side forces may be exerted upon the sucker rod 120 and other components. Since a greater number of wellbores are being drilled with horizontal geometries, failures of sucker rods and long stroke systems are an increasing problem. There is a need for control of loads upon long stroke systems so that the systems may operate for longer periods of time without failure.

There is a need to provide an apparatus and methods to operate long stroke systems that are easier to operate than conventional apparatus and methods.

There is a further need to provide apparatus and methods that do not have the drawbacks discussed above, namely the premature maintenance and breakage of long stroke systems.

There is a still further need to reduce economic costs associated with long stroke operations and apparatus.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, an arrangement is disclosed. The arrangement may comprise a power unit configured to make power for the arrangement and a pumping unit connected to the power unit. The pumping unit may be configured with a hydraulic cylinder with a piston within the cylinder, wherein the piston is configured to move from a first position to a second position, the hydraulic cylinder configured to operate with a fluid delivered from a fluid system. The pumping unit may also be configured with a structural arrangement configured near the hydraulic cylinder. The pumping unit may also be configured with a sensor package configured to be attached to the structural arrangement, the sensor package configured to measure a feature of the arrangement during operation.

In one example embodiment, a method is disclosed. The method may comprise performing a pumping operation. The method may also further comprise measuring at least one value of a tilt and movement of a component in a pumping arrangement within a hydraulic cylinder. The method may also further comprise comparing the measured at least one value of tilt and movement in the defined plane to a threshold value. The method may also further comprise continuing to perform the pumping operation when the measured value does not exceed the threshold value. The method may also further comprise altering a performance value of the pumping operation when the measured value exceeds the threshold value.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted; however, that the appended drawings illustrate only typical embodiments of this disclosure and are therefore not be considered limiting of its scope, for the disclosure may admit to other equally effective embodiments.

Figure 1:
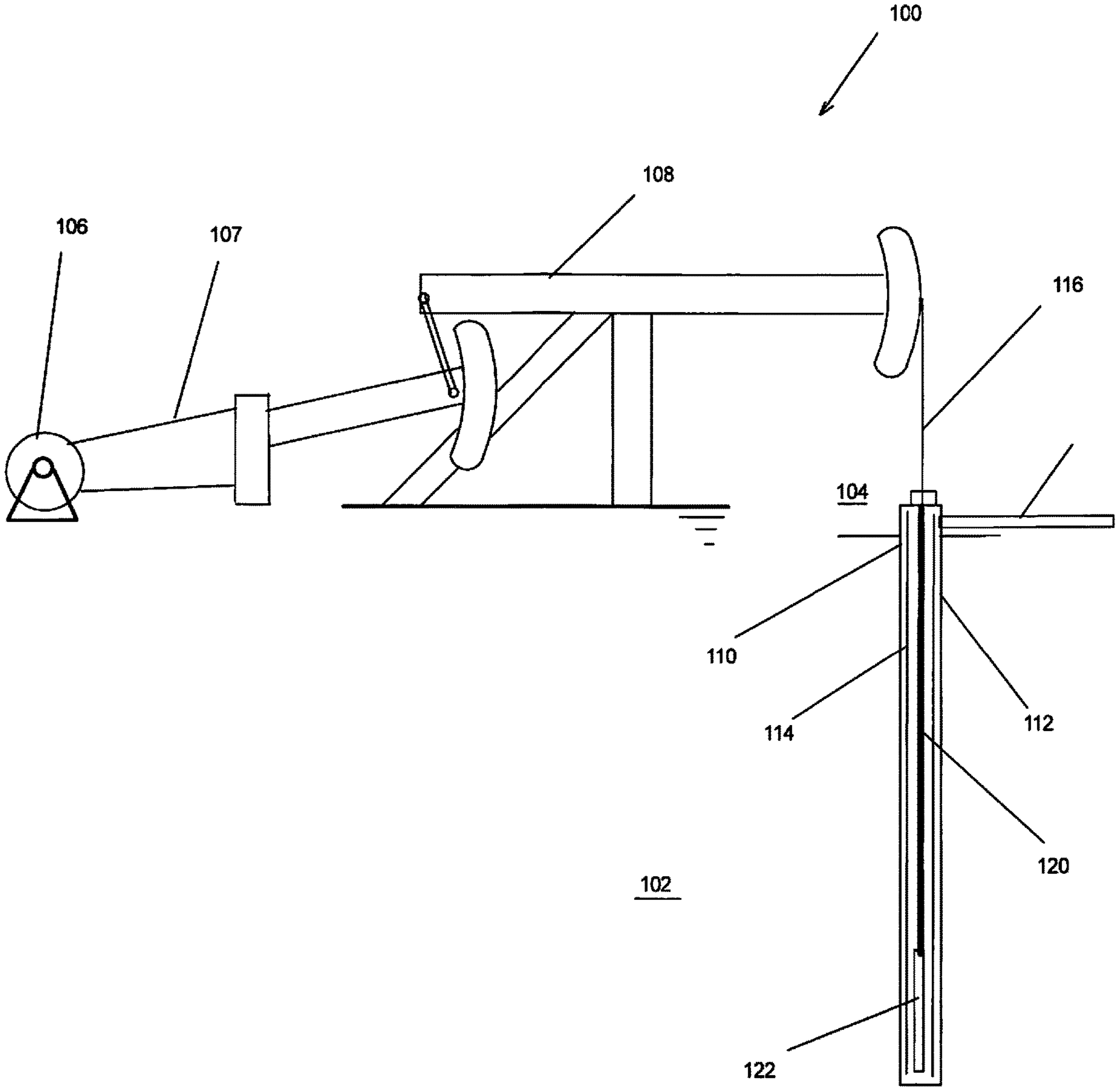
PRIOR ART FIG. 1
FIG. 1 is a side view of an arrangement for a conventional long stroke pumping system.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood; however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood; however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Figure 2:
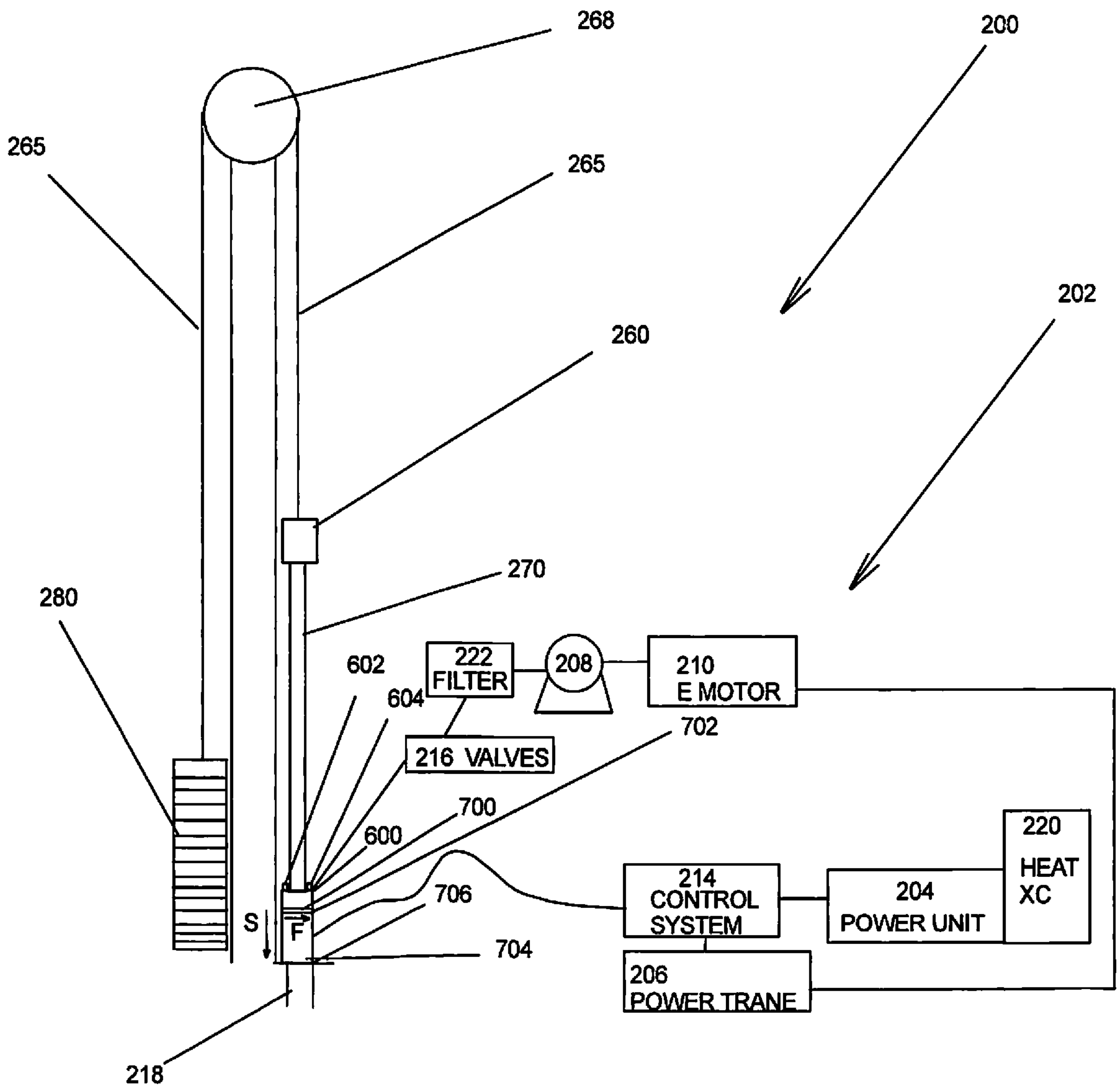
FIG. 2 is a side view of an arrangement for limiting side forces in accordance with one example embodiment of the disclosure.

Referring to FIG. 2, an embodiment of the disclosure in the form of an arrangement 200 is presented. The embodiment provides for superior failure resistance compared to conventional apparatus 100, described in FIG. 1. To develop the embodiment in FIG. 2, an exhaustive study was conducted on common failure modes for short stroke units and some long stroke units. The arrangement 200 provides a pumping unit 202 and a power unit 204. In extensive testing, the arrangement 200 provides superior efficiency and costs compared to the conventional apparatus 100. For example, the arrangement 200 provides for longer run times between maintenance activities. In some instances, the run times are double length run times indicating clear superiority compared to conventional apparatus 100.

The power unit 204, in the non-limiting embodiment, provides controls for the arrangement 200 to enable actuation and operation of the arrangement 200. A power train 206 is provided that includes a swash plate hydraulic pump arrangement 208 that is powered by an electric motor 210. In one non-limiting embodiment, the electric motor 210 may include a magnet, which may be a permanent magnet. A permanent magnet may be used to reduce energy consumption. Such reduced energy consumption provides the arrangement 200 with a superior carbon footprint compared to conventional apparatus 100. In embodiments, the pumping unit 202 is configured with a fluid filled cylinder 600. In embodiments, the fluid filled cylinder 600 may be an oil filled cylinder. In further embodiments, logic valves 216 are provided to control fluid for the fluid filled cylinder 600. A control system 214 is further provided to allow for control of the logic valves 216. The control system 214 may be configured with programming such that real-time monitoring may be accomplished for the wellbore 218, the pumping unit 202 and other associated systems.

In further embodiments, heat exchangers 220 are provided. The heat exchangers 220 are incorporated into the power unit 204. The heat exchangers 220 provide a capability for temperature/climate/environment adjustment to allow the power unit 204 to be installed in various environments.

In embodiments, a filter system 222 is incorporated into the arrangement 200 to allow for straining associated fluid systems of the arrangement 200. In embodiments, filter components of the filter system 222 may be swapped/changed without disrupting production from the arrangement 200. Conventional systems do not provide for such capabilities. As will be understood, the filter system 222 is configured to remove contaminants from the fluid systems, thereby preventing premature wearing of metallic surfaces. This filtering, accompanied with side load controls instituted by the control system 214 allows for prevention of destructive run times, enhancing overall arrangement viability.

In embodiments, the control system 214 is provided with programming to control side load conditions that often plague systems. Such programming may include, but not be limited to, reducing run speed, stopping the arrangement 200, providing a warning light condition to an operator and/or combinations of all of these mitigation features.

In embodiments that use controls for side load conditions, implementation of these features offers significant savings for operators. Operators and/or the control system 214 prevent tearing/wear or abnormal running conditions, thereby preserving the overall arrangement 200. By using these side load control systems with the control system 214, the arrangement 200 may run for over twice the run times of conventional systems. In areas where mobilization and repair of equipment is of concern, the arrangement 200 provides significant advantages on maintenance. Moreover, in such instances, since the arrangement 200 is significantly less prone to breakage, the overall cost of production of hydrocarbons from the wellbore 218 is reduced compared to conventional apparatus. In embodiments described later, the control system 214 may use inputs from various components, such as tilt sensors. The tilt sensors may be installed at vibration prone positions for the arrangement 200. If the amount of tilt measured by a tilt sensor exceeds a predetermined value, it may be concluded that side load forces on the long stroke arrangement 200 exceeds desired levels. Operator action or automatic action may be taken to limit the amount of side load forces once the threshold value is reached.

In embodiments, the stroke length of the arrangement 200 may be varied according to operator preset limits. Additionally, the arrangement 200 may be automatically controlled through programming for the control system 214 to alter stroke length, as needed, obviating the need for operator interaction. Embodiments of the arrangement may be configured up to 40,000 pounds of load capacity. Volume production for the arrangement 200 may be 5000 barrels per day in some non-limiting embodiments. As illustrated, the arrangement 200 is configured with a block 260 that connects to the sucker rod 270. Movement of the block 260 and the connected sucker rod 270 is achieved by movement of a counterweight 280 connected to the block 260 by cables 265 looped over sheaves 268 located at the top of the arrangement 200. When movement of the counterweight 280 is achieved, the sucker rod 270 moves within the wellbore 218, allowing for a lifting action for hydrocarbons inside the wellbore 218.

Figure 3:
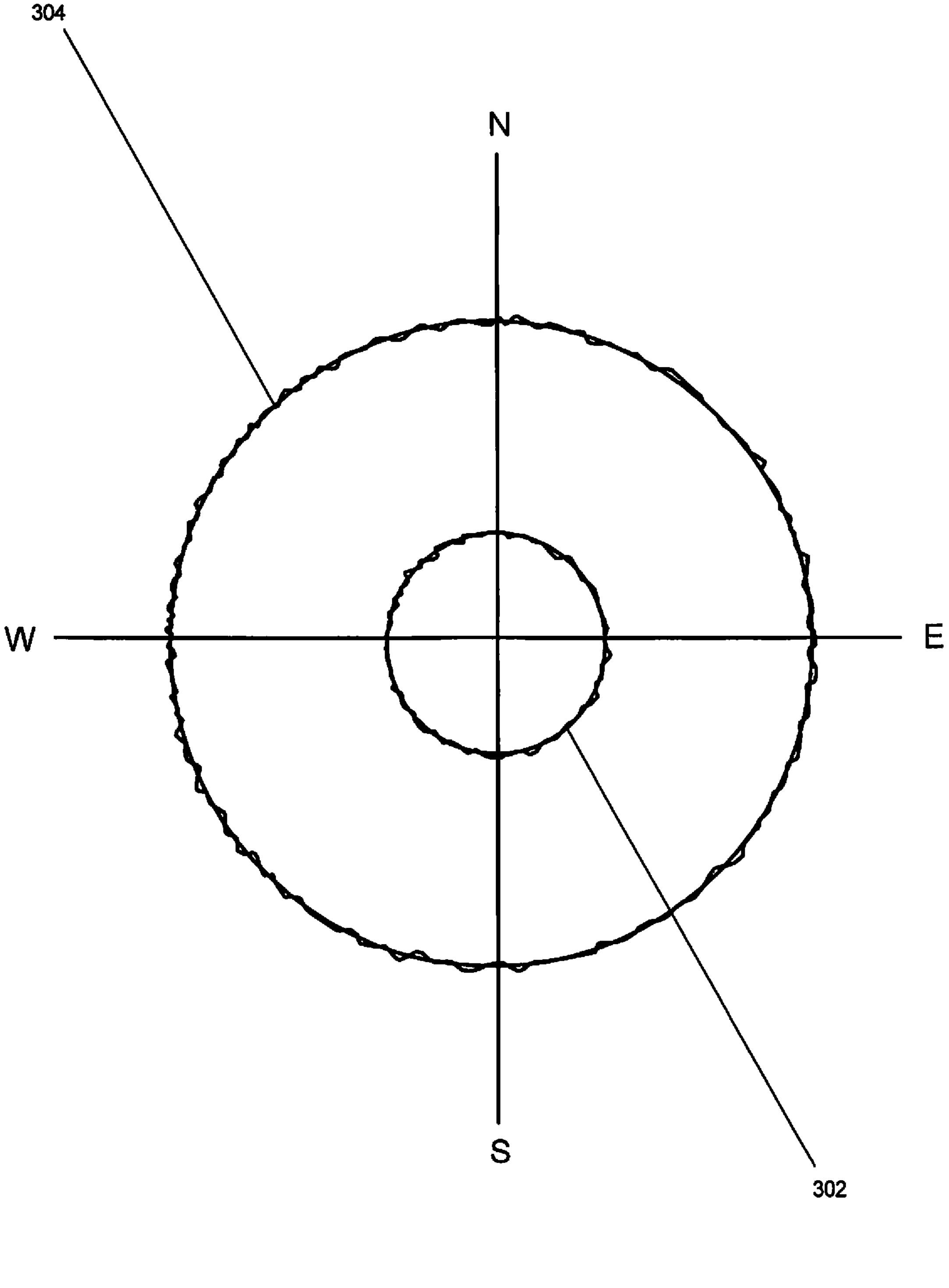
FIG. 3 is a graph of deviation of a crown cylinder in a horizontal plane during operational, running periods.

Referring to FIG. 3, a graph of deviation of a crown cylinder horizontal plane are illustrated. As per the graph, the inner circular portion of the graph 302 shows lower position deviation, while the outer circular portion of the graph 304 shows upper position deviation. As can be seen through the graph, position deviation is minimized in both upper and lower measurement positions. Measurement position was captured through use of a position sensing system. In one embodiment, a MEMS gyro may be used.

Figure 4:
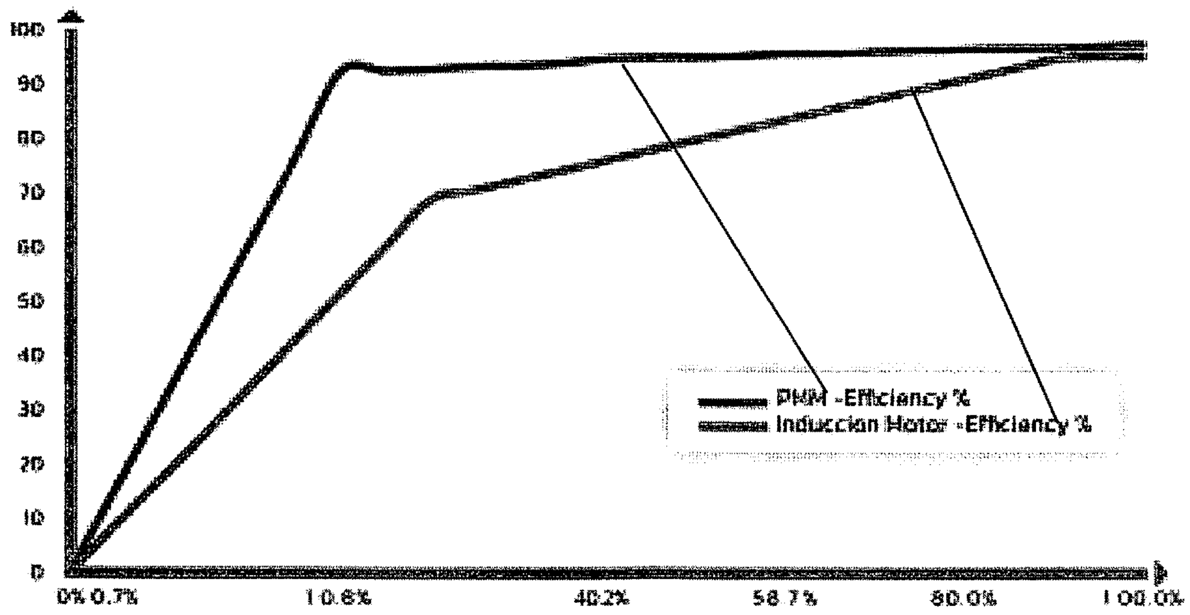
FIG. 4 is a graph of efficiency versus operational speed of one example embodiment of the disclosure and a conventional motor.

Referring to FIG. 4, a graph of power savings efficiency is illustrated. The top line of the graph shows the use of a permanent magnet motor used in the embodiments of the present disclosure. The lower line of the graph shows conventional induction motor efficiency. As can be seen in FIG. 4, the overall efficiency of the permanent magnet motor is vastly superior to conventional systems. In some instances, efficiency may be 30 percent greater, leading to much more efficient operation and lower costs of production.

Figure 5:
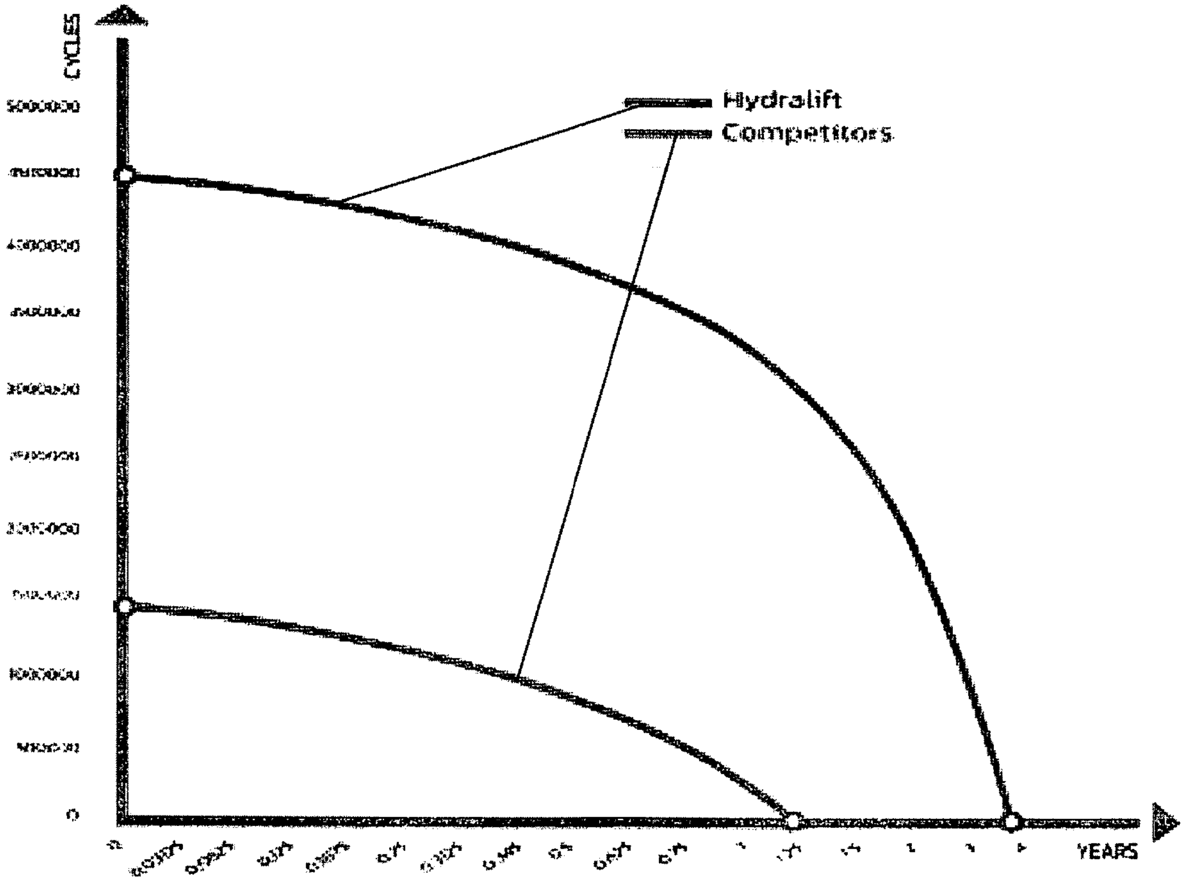
FIG. 5 is a graph of number of run cycles versus years of operation for one example embodiment of the disclosure and a conventional unit.

Referring to FIG. 5, a graph of number of run cycles versus years is illustrated. The top portion of the graph represents the operations of embodiments of the current disclosure. The lower portion of the graph represents the operations of conventional apparatus. As can be seen through FIG. 5, operational capabilities are vastly improved for the number of available run cycles as well as time of operation for embodiments of the current disclosure compared to conventional systems.

In some embodiments, the temperature of operation of the arrangement 200 may be between −20 degrees Celsius and 60 degrees Celsius. The arrangement 200 may have an operational pressure of up to 1600 psi. A maximum pressure for the arrangement 200 may be up to 2500 psi. In further embodiments, the motor may be a 150 hp permanent magnet motor with a voltage of 480 VAC. A full load capability for the motor may be 175 amps. Efficiency of the motor may be 97 percent with a rotating speed of 1500 revolutions per minute. In further embodiments, vibration dampers may be used in conjunction with the motor.

In some embodiments, a data retrieval system may be used. In one embodiment, the data retrieval system may log data from a local positioning of components of the arrangement 200. In another example embodiment, the data retrieval system may send data obtained to a remote location for analysis and/or recording. Such sending of data may be performed through a supervisory control and data acquisition ("SCADA") system. In other embodiments, a testing system may be provided to automatically test components, such as actuator valves, to allow for quick diagnosis for field personnel. Data from the testing system may be provided in the form of a report that is obtainable by field personnel on an attached computer. Tracking of operating parameters, run times, numbers of cycles and other run data may be maintained within the arrangement 200 which may be accessible by a computer configured to interface with the arrangement 200. The arrangement 200 may also be configured to allow for software revisions, at periodic intervals, to allow for further refinement of operations based on user inputs. Such user inputs may be through successful runs completed in similar operating environments, to allow for efficient running of the arrangement 200.

In embodiments, the arrangement 200 may be equipped with a sensor package, such as the control system 214, to allow for correct field installation. As will be understood, field conditions may vary with slope. Such slope differences may affect the overall position of moving/rotating equipment. To ensure a high-quality installation of the arrangement 200, the sensor package may be equipped with tilt sensors. In one embodiment, two tilt sensors may be used to evaluate two primary planes of action, such as a N/S plane and an EW plane. The sensor package may interact with the control system 214 to provide input for ultimate control of the arrangement 200.

Figure 6:
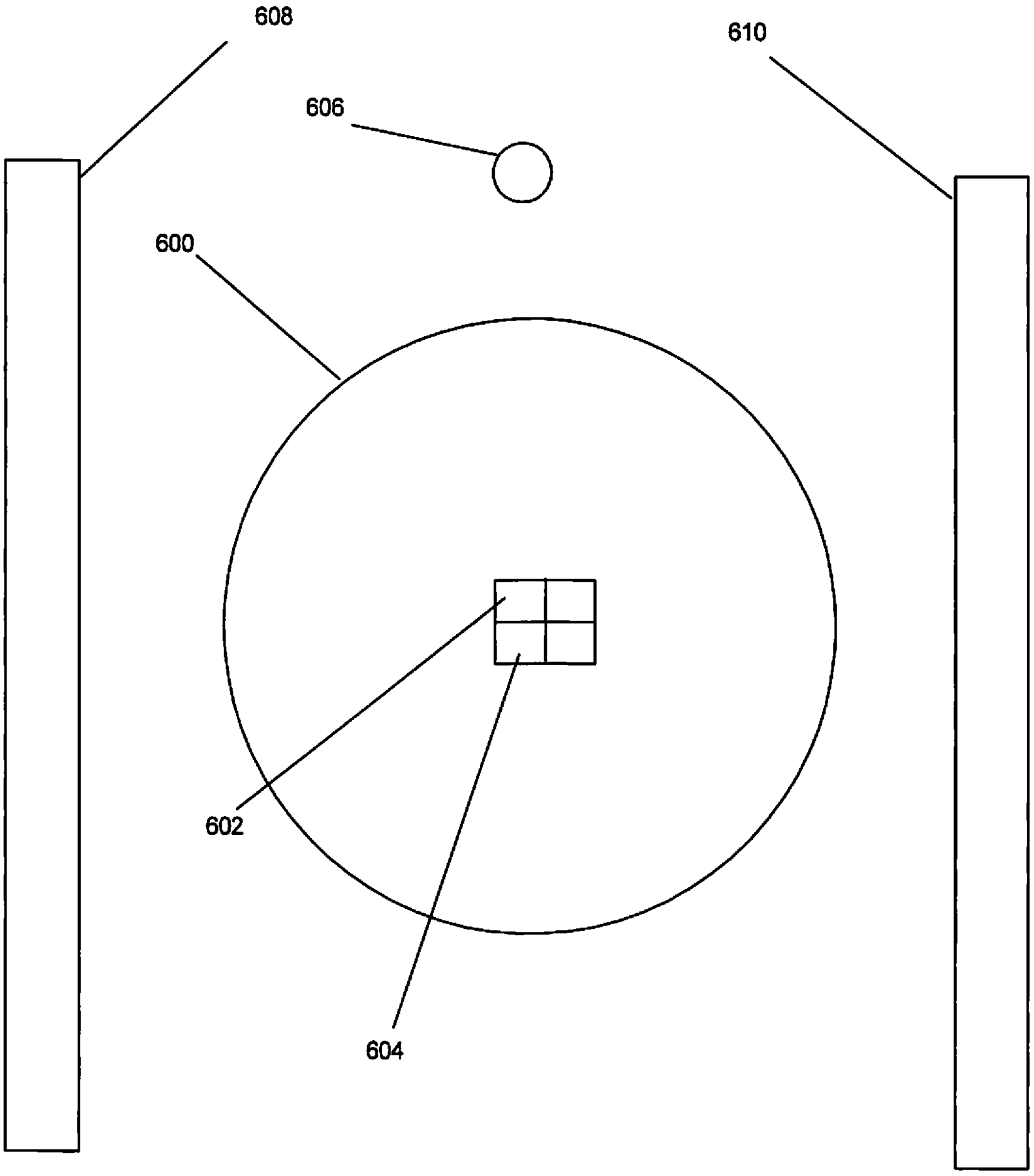
FIG. 6 is a top view of the structural components of the piston/hydraulic cylinder arrangement of FIG. 2, to limit the side loads experienced during operations.

Referring to FIG. 6, a downward looking plane view is presented. In order to maintain the main hydraulic cylinder 600 in position, as discussed above, a first tilt sensor T1 602 and a second tilt sensor 604 are provided to maintain locational monitoring of the hydraulic cylinder 600. As discussed above, the tilt sensors 602, 604 may be part of a sensor package, control system 214. A structural support 606, such as a bar, may be connected to a pair of pulleys 608, 610, all of which are attached to the cylinder 600. As forces are transferred to the structural support 606, little to no wobble is present during running of the arrangement 200. As a further benefit, no abrasion or wear occurs during running times, as contact is minimized during a run, resulting in more efficient and longer runs.

Figure 7:
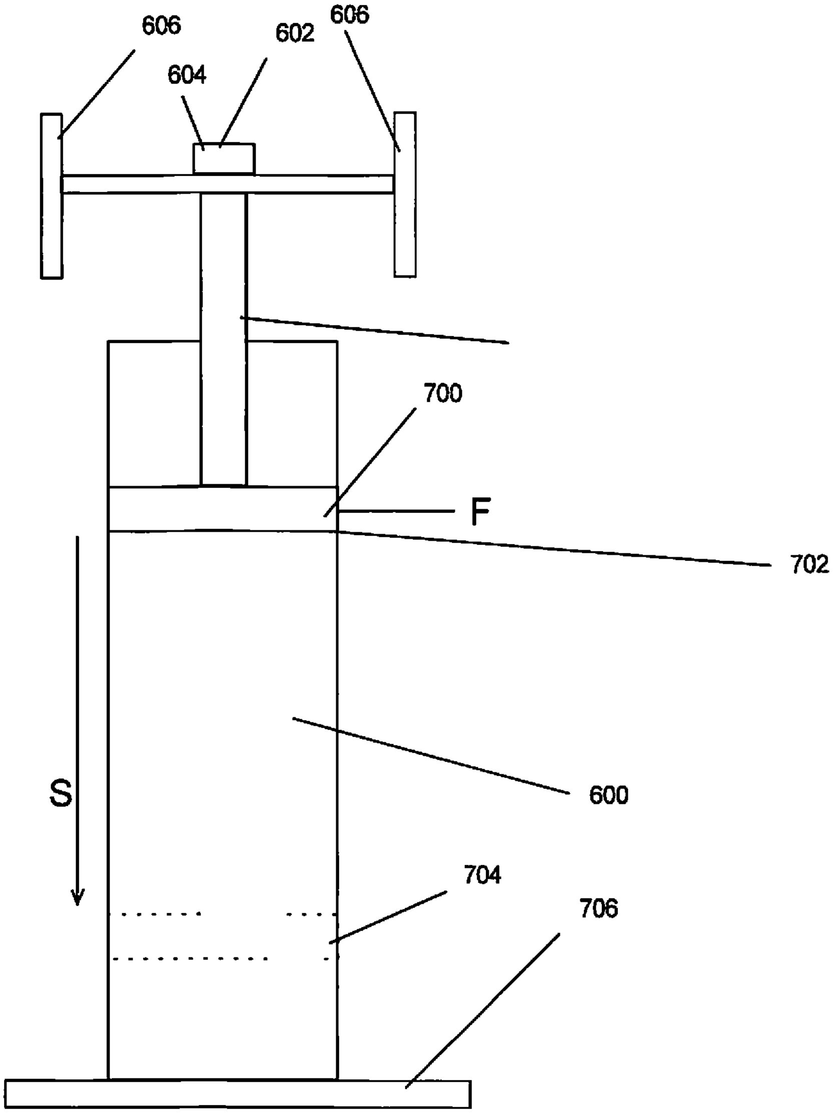
FIG. 7 is a side view of the structural components of a piston/hydraulic cylinder arrangement to limit the side loads experienced during operations.

Referring to FIG. 7, a side elevational view of structural elements of the arrangement 200 as presented. As can be seen, a piston 700 is configured to move from a first position 702 to a second position 704 within the main hydraulic cylinder 600. The tolerances between the piston 700 and the inner walls of the cylinder 600 may be close, therefore accurate positioning of the piston 700 within the cylinder 600 is to be maintained. As seen, wobble of the piston 700 within the cylinder 600 may result in a side load force F. To control this side load F, structural supports 606 provide resistance to movement. Throughout the stroke(S) of the piston, the structural supports, such as a bridle 606 may be anchored to a skid 706 or other structural arrangement to provide for a rigid structure. Measurement of the tilt in the N-S and E-W planes may be measured by tilt sensors T1 602 and T2 604. The data obtained by the tilt sensors 602, 604 are fed back to the control system for evaluation. If either of the readings of the tilt sensors 602, 604 are outside of a threshold value, operations can be curtailed, such as running the piston 700 at a lower speed, reducing the potential force F and potential wear.

As will be appreciated, such side load control may be beneficial in not only hydrocarbon removal activities, but also other operations where stroking systems are used. Such systems may be mechanical actuators used in heavy equipment, military vehicles, airplanes, processing equipment or other equipment that exhibit wear from contacts between a piston and a main hydraulic cylinder. As will further be appreciated, such side load control capability is even more helpful in heavy loads and/or during high operational speeds as the impacts of wear of contact between the piston and the cylinder would be greater. As provided above, additionally, in the event of a contact between components where wearing would occur, any wear particles generated would be separated out from the other fluid systems through the previously described filtration system, thereby preventing further degradation.

As will be further appreciated, measurements of the position of the stroke of the piston may be combined with the data obtained by the tilt sensors T1 602, T2 604. To this end, the amount of maximum tilt (and potential wear) may be determined at specific points of travel by the piston within the cylinder 600. Such data obtained may be used in further manufacturing to allow for greater clearance at specific positions of piston travel within the cylinder 600. As will be understood, the position for maximum potential contact may not be at the bottom of the stroke S, as shown, but may be at other positions due to vibrational effects and harmonics experienced during runs.

Figure 8:
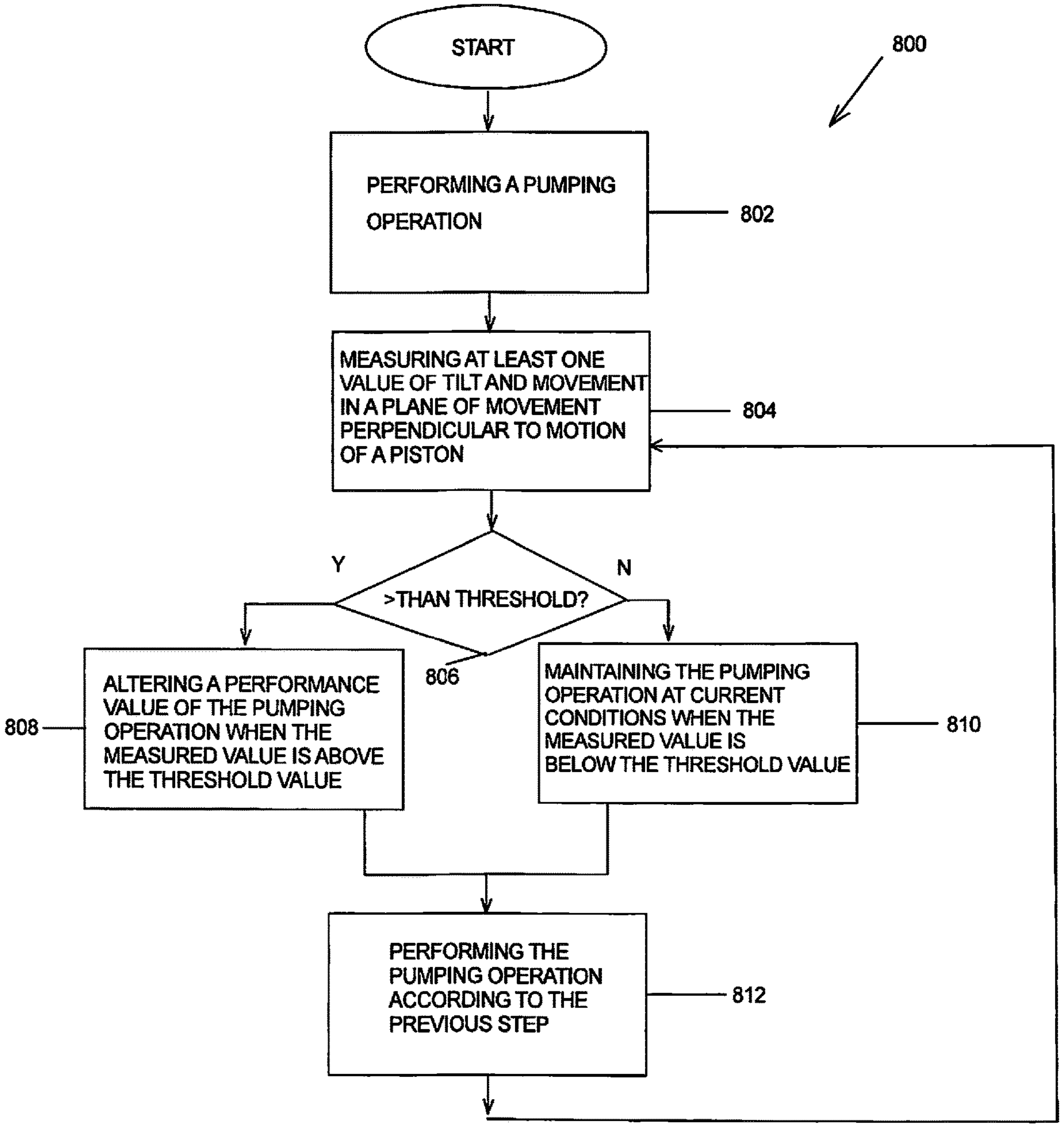
FIG. 8 is a method for control of side load forces in accordance with one example embodiment of the disclosure.

Referring to FIG. 8, a method 800 of operation of one example embodiment of the disclosure is provided. At 802, a pumping operation may occur. The pumping operation may be, for example, operating pumping equipment to remove hydrocarbons from a underground wellbore. Other potential methods are also possible. During the operational period, at 804, at least one value of tilt or movement of a component of the pumping arrangement is measured. The measurements that occur at 804 may be through sensors, such as tilt sensors or positional sensors disclosed above. After measurement of the data at 804, the data is compared to a threshold value to determine if the pumping apparatus is operating within specifications. If the values measured are greater than the threshold values, the method may progress to 808 where a performance value of the pumping operation may altered. The performance value may be, for example, the speed of the pumping operation. If the comparison at 806 indicates that the measured values at 804 are less than the threshold value, then a continuity of operation is conducted at 810 and 812, with the method returning to step 804. As will be understood, if the threshold value is exceeded, a warning light may be illuminated, to alert operators. Notifications may be through, as previously described, a SCADA system. In embodiments, the component of the pumping arrangement is a hydraulic cylinder with an inserted reciprocating piston.

Figure 9:
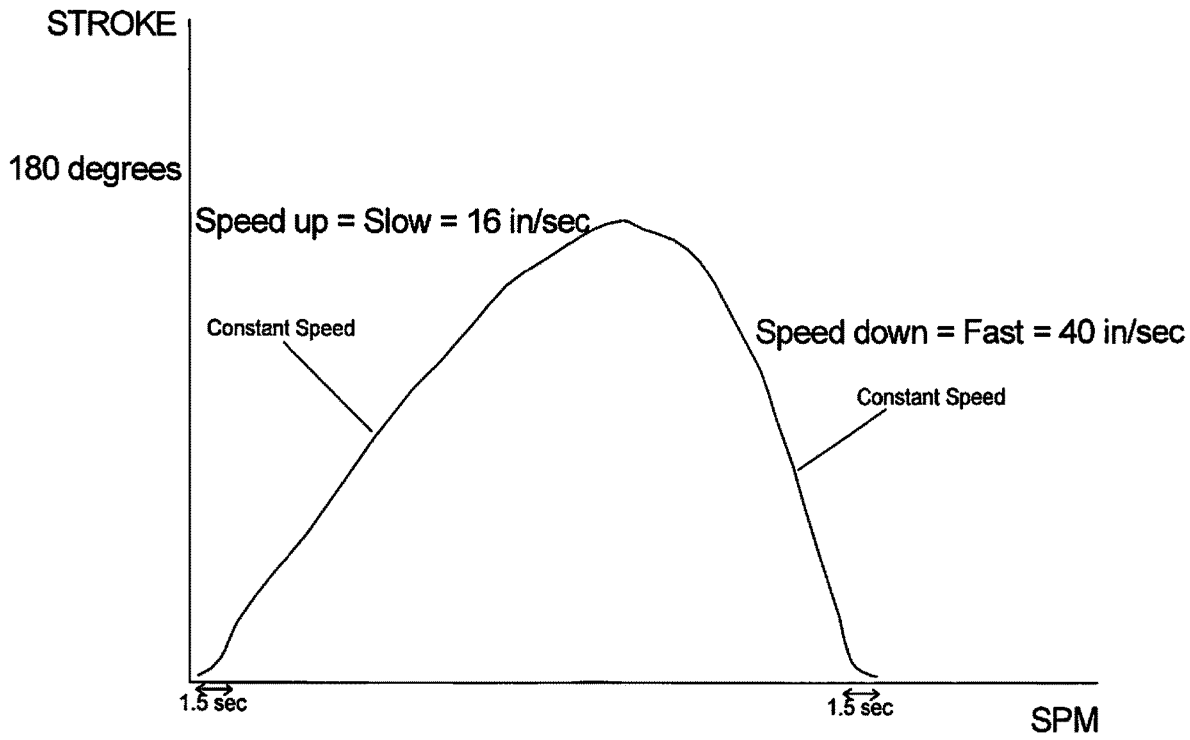
FIG. 9 is a graph of strokes in degrees versus strokes per minute for one example embodiment of the disclosure.

Referring to FIG. 9, a graph of degrees of stroke versus strokes per minute for one example embodiment of the disclosure is illustrated. As can be seen an envelope is created from top dead center up to 180 degrees. During most of this travel, a consistent speed is achieved, providing accurate and reliable operations. After achieving 180 degrees in position, the envelope changes as the end of the stroke occurs. As illustrated, speed up is relatively slow compared to the speed down which is relatively fast compared to the speed up value.

Figure 10:
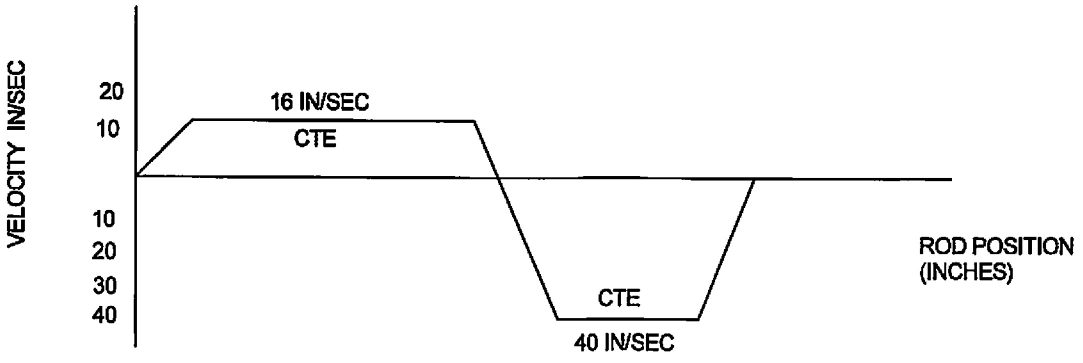
FIG. 10 is a graph of velocity versus rod position for one example embodiment of the disclosure.

Referring to FIG. 10, a graph of velocity verses rod position is illustrated for one example embodiment of the disclosure. As can be seen, matching FIG. 9 to FIG. 10, at the apex of envelope of FIG. 9, the velocity changes direction. For speed up conditions, the relative speed achieved is less than the relative speed of the slow down condition.

Different configurations of the arrangement 200 are possible. Table 1 presents running data of a sample arrangement 200 given different piston diameters in inches. Values for Table 1 are presented for a stroke length of 360 inches.

TABLE 1

| Stroke Length (In) | Lifting (lb) | Strokes per minute (SPM) | Strokes per minute (SPM) | Diameter of Piston (In.) | Filled Up Pump Down Hole 2.4 SPM | Filled Up Pump Down Hole 1.0 SPM |
|---|---|---|---|---|---|---|
| 360 | 40,000 | 2.4 | 1 | 2.0 | | 239 |
| 360 | 40,000 | 2.4 | 1 | 2.25 | 726.08 | 303 |
| 360 | 40,000 | 2.4 | 1 | 2.5 | 896.40 | 374 |
| 360 | 40,000 | 2.4 | 1 | 2.75 | 1084.64 | 452 |
| 360 | 40,000 | 2.4 | 1 | 3.25 | 1514.92 | 631 |
| 360 | 40,000 | 2.4 | 1 | 3.75 | 2016.90 | 840 |
| 360 | 40,000 | 2.4 | 1 | 4.75 | 3236.00 | 1348 |
| 360 | 40,000 | 2/4 | 1 | 5.75 | 4741.96 | 1976 |

Table 2 presents running data of a sample arrangement 200 given different piston diameters in inches, for a stroke length of 336 inches.

TABLE 2

| Stroke Length (In) | Lifting (lb) | Strokes per minute (SPM) | Strokes per minute (SPM) | Diameter of Piston (In.) | Filled Up Pump Down Hole 2.4 SPM | Filled Up Pump Down Hole 1.0 SPM |
|---|---|---|---|---|---|---|
| 336 | 40,000 | 2.4 | 1 | 2.0 | 535.45 | 223 |
| 336 | 40,000 | 2.4 | 1 | 2.25 | 677.68 | 282 |
| 336 | 40,000 | 2.4 | 1 | 2.5 | 836.64 | 349 |
| 336 | 40,000 | 2.4 | 1 | 2.75 | 1012.33 | 422 |
| 336 | 40,000 | 2.4 | 1 | 3.25 | 1413.92 | 589 |
| 336 | 40,000 | 2.4 | 1 | 3.75 | 1882.44 | 784 |
| 336 | 40,000 | 2.4 | 1 | 4.75 | 3020.27 | 1258 |
| 336 | 40,000 | 2/4 | 1 | 5.75 | 4425.83 | 1844 |

Figure 11:
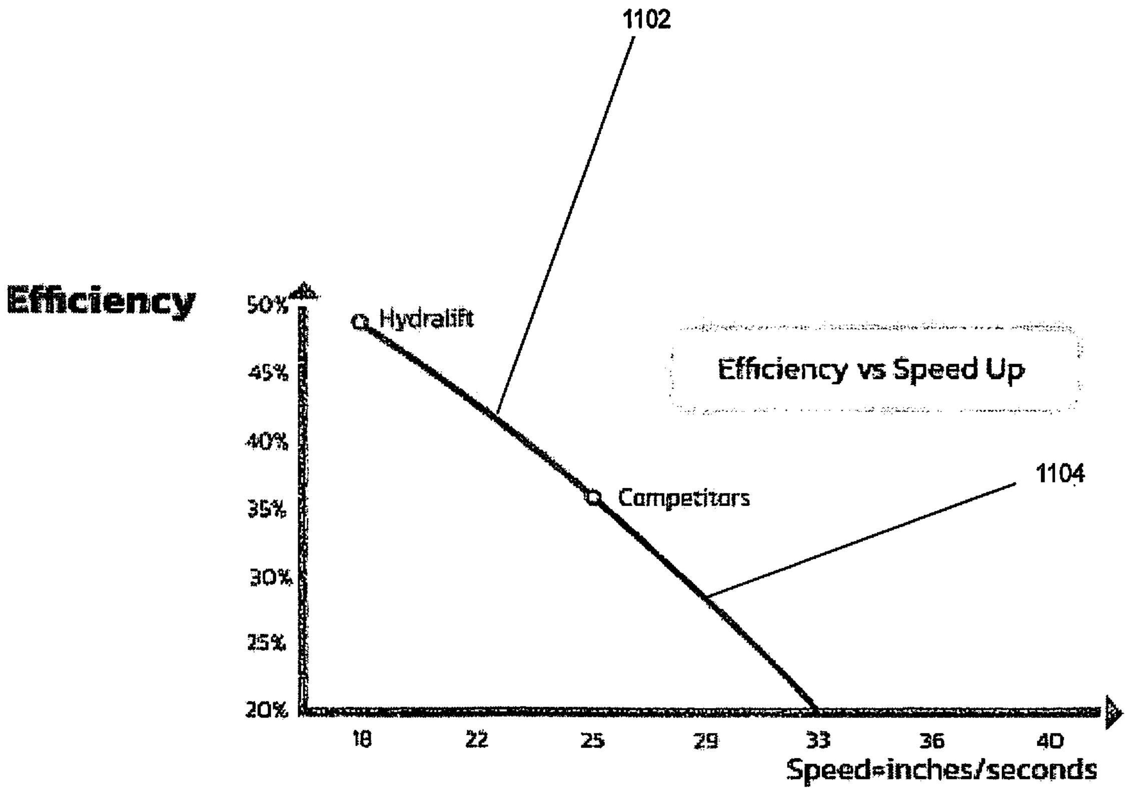
FIG. 11 is a graph of efficiency versus speed for one example embodiment of the disclosure.

Referring to FIG. 11, a graph of efficiency versus speed in inches per second (speed up) is shown. As illustrated, the arrangement 200 disclosed provides efficiency capabilities that are not possible with conventional apparatus. Efficiencies reached are much higher leading to reduced operating costs. As illustrated, embodiments of the disclosure, at 1102, operate at higher efficiency and lower speed up values, compared to lower efficiency values at higher speed up values for conventional apparatus 1104.

In embodiments, aspects of the disclosure provide for control of loads upon long stroke systems so that the systems may operate for longer periods of time without failure compared to conventional units.

As illustrated and described, aspects of the disclosure provide an apparatus and method to operate long stroke systems that are easier to operate than conventional apparatus and methods.

Embodiments described also provide apparatus and methods that do not have the drawbacks discussed above, namely the premature maintenance and breakage of long stroke systems.

The embodiments described above also reduce economic costs associated with long stroke operations and apparatus.

In one example embodiment, an arrangement is disclosed. The arrangement may comprise a power unit configured to make power for the arrangement and a pumping unit connected to the power unit. The pumping unit may be configured with a hydraulic cylinder with a piston within the cylinder, wherein the piston is configured to move from a first position to a second position, the hydraulic cylinder configured to operate with a fluid delivered from a fluid system. The pumping unit may also be configured with a structural arrangement configured near the hydraulic cylinder. The pumping unit may also be configured with a sensor package configured to be attached to the structural arrangement, the sensor package configured to measure a feature of the arrangement during operation.

In another example embodiment, the arrangement may be configured wherein the sensor package is at least one of a tilt sensor, an accelerometer and a position measuring sensor.

In another example embodiment, the arrangement may be configured wherein the sensor package is at least two tilt sensors, wherein each of the tilt sensors is configured to measure a different plane.

In another example embodiment, the arrangement may further comprise a filtration system configured to filter fluid within the fluid system.

In another example embodiment, the arrangement may be configured wherein the power unit is configured with permanent magnets.

In another example embodiment, the arrangement may further comprise a data acquisition system, wherein the data acquisition is configured to obtain data from the sensor package and distribute the data to a user.

In another example embodiment, the arrangement may be configured wherein the data acquisition system is configured with a supervisory control and data acquisition system configured to send the data to a remote location.

In another example embodiment, the arrangement may further comprise at least two logic valves configured within the fluid system, the logic valves configured to alter a fluid flow path of the fluid system.

In another example embodiment, the arrangement may be configured wherein the pumping unit is further configured with at least one heat exchanger.

In another example embodiment, the arrangement may be configured wherein the structural arrangement is configured of at least one rod.

In one example embodiment, a method is disclosed. The method may comprise performing a pumping operation. The method may also further comprise measuring at least one value of a tilt and movement of a component in a pumping arrangement within a hydraulic cylinder. The method may also further comprise comparing the measured at least one value of tilt and movement in the defined plane to a threshold value. The method may also further comprise continuing to perform the pumping operation when the measured value does not exceed the threshold value. The method may also further comprise altering a performance value of the pumping operation when the measured value exceeds the threshold value.

In another example embodiment, the method may be performed wherein the pumping operation is configured to pump hydrocarbons from a wellbore environment to an up-hole environment.

In another example embodiment, the method may be performed wherein the altering the performance value of the pumping operation is altering a speed of the pumping operations.

In another example embodiment, the method may be performed wherein the altering the performance value of the pumping operation is stopping a pumping operation.

In another example embodiment, the method may further comprise notifying an operator of a discrepancy between the measured value and the threshold value.

In another example embodiment, the method may be performed wherein the notifying of the operator is through illumination of a warning light.

In another example embodiment, the method may be performed wherein the notifying of the operator is through a supervisory control and data acquisition system.

In another example embodiment, the method may be performed wherein the at least one measured value is a tilt of a component of the pumping operation.

In another example embodiment, the method may be performed wherein the at least one measured value is a displacement of a component of a pumping arrangement during operations.

In another example embodiment, the method may be performed wherein the movement of the component relates to a component of a hydraulic cylinder.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. An arrangement, comprising:

a power unit configured to make power for the arrangement; and a pumping unit connected to the power unit, comprising:

a hydraulic cylinder with a piston within the cylinder, wherein the piston is configured to move from a first position to a second position, the hydraulic cylinder configured to operate with a fluid delivered from a fluid system;

a structural arrangement configured near the hydraulic cylinder; and a sensor package configured to be attached to the structural arrangement, the sensor package configured to measure a feature of the arrangement during operation wherein the sensor package is at least two tilt sensors, wherein each of the tilt sensors is configured to measure a different plane; and a side load control system connected to the pumping unit, the side load control configured to prevent a side load developed during running of the arrangement.

2. The arrangement according to claim 1, wherein the sensor package is at least one of a tilt sensor, an accelerometer and a position measuring sensor.

3. The arrangement according to claim 1, further comprising:

a filtration system configured to filter fluid within the fluid system.

4. The arrangement according to claim 1, wherein the power unit is configured with permanent magnets.

5. The arrangement according to claim 1, further comprising:

a data acquisition system, wherein the data acquisition is configured to obtain data from the sensor package and distribute the data to a user.

6. The arrangement according to claim 5, wherein the data acquisition system is configured with a supervisory control and data acquisition system configured to send the data to a remote location.

7. The arrangement according to claim 1, further comprising:

at least two logic valves configured within the fluid system, the logic valves configured to alter a fluid flow path of the fluid system.

8. The arrangement according to claim 1, wherein the pumping unit further configured with at least one heat exchanger.

9. The arrangement according to claim 1, wherein the structural arrangement is configured of at least one rod.

* * * * *